Figure 1:
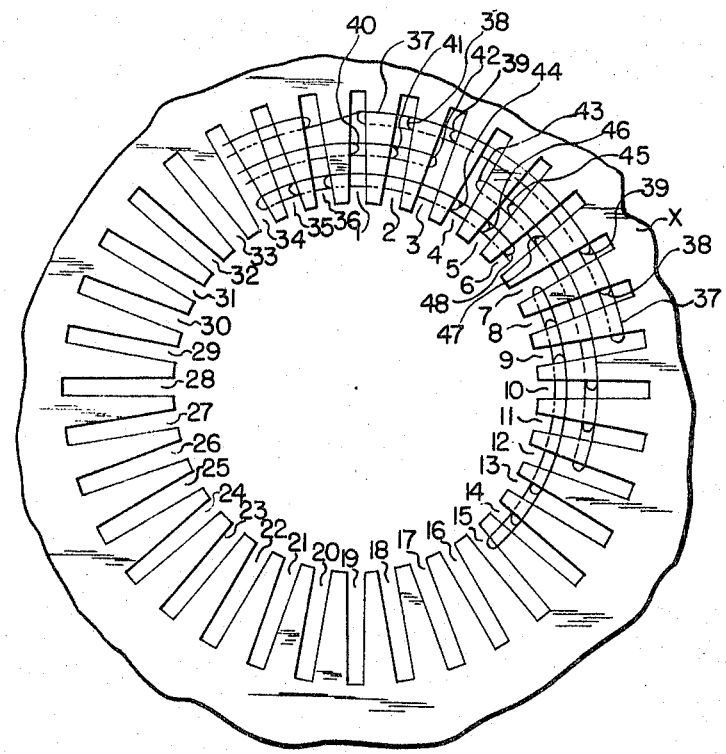

Oct. 17, 1967  H. E. JORDAN  3,348,084
GRADED CONCENTRIC WINDING DYNAMOELECTRIC MACHINE
Filed June 24, 1965  2 Sheets-Sheet 1

INVENTOR.
HOWARD E. JORDAN
BY Woodling, Krost,
Granger and Rust
ATTORNEYS

Oct. 17, 1967   H. E. JORDAN   3,348,084
GRADED CONCENTRIC WINDING DYNAMOELECTRIC MACHINE
Filed June 24, 1965   2 Sheets-Sheet 2

INVENTOR.
HOWARD E. JORDAN
BY Woodling, Krost,
Granger and Rust
ATTORNEYS 3,348,084
GRADED CONCENTRIC WINDING
DYNAMOELECTRIC MACHINE
Howard E. Jordan, Euclid, Ohio, assignor to The Reliance Electric and Engineering Company, a corporation of Ohio
Filed June 24, 1965, Ser. No. 466,686
9 Claims. (Cl. 310—202)

This invention relates in general to dynamoelectric machines, and more particularly to dynamoelectric machines having a permeable core with concentric, integral-slot, graded windings.

One example of such dynamoelectric machine is the commonly used three phase induction motor. The purpose of the concentric graded winding is to approach as closely as possible to a sine wave of m.m.f. in the air gap of the machine in order to avoid harmonics.

Polyphase induction motors conventionally have used lap windings on the primary core, which is usually the stator. Lap windings are not readily adapted for winding by machine and consequently they are usually form wound and then hand inserted, which is a significant factor in the manufacturing cost of such motors. To overcome this limitation, various concentric winding arrangements have been proposed heretofore which enable the use of machine winding in the manufacture of such motors. However, such prior concentric winding arrangements have not been entirely satisfactory from the standpoint of minimizing stray load losses caused by space harmonics in the air-gap m.m.f. field and suppression of cusps in the speed-torque curve.

The present invention is directed to a novel concentric, integral-slot, graded winding arrangement in a polyphase dynamoelectric machine such as a three phase induction motor, which not only is adapted for machine winding, but also minimizes stray load losses and speed-torque curve cusps caused by higher order harmonic m.m.f. fields.

Accordingly, it is the principal object of this invention to provide a three phase induction motor having a novel and improved concentric integral-slot, graded winding which minimizes stray load losses caused by harmonics in the air-gap m.m.f. field.

It is also an object of this invention to provide a three phase induction motor having such a winding which is adapted for machine winding and which also may be hand wound, if desired.

Another object of this invention is to provide a three phase induction motor having such a winding which enables each winding slot in the primary core to be substantially filled.

Further objects and advantages of this invention will be apparent from the following detailed description of its fundamental principles and specific embodiments thereof, with reference to the accompanying drawings.

Figure 2:
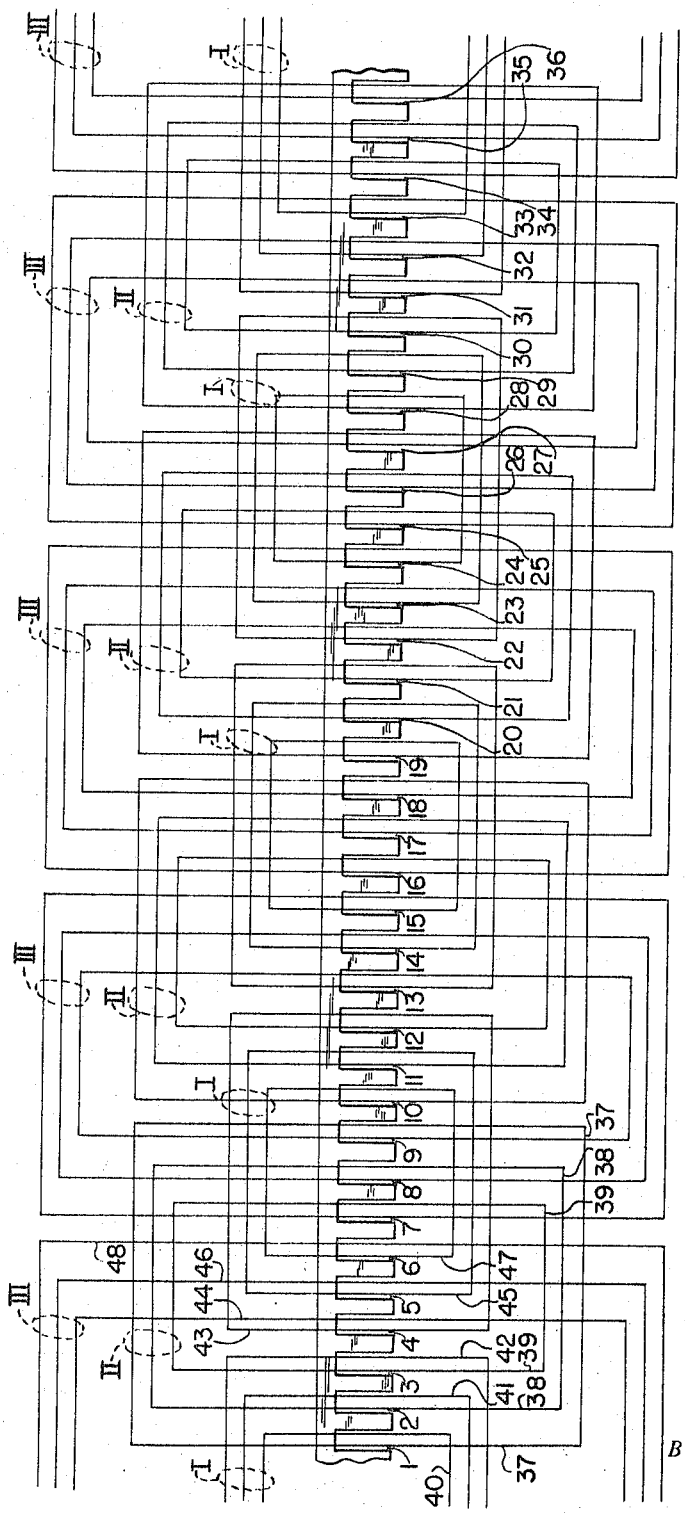

In the drawings:

FIGURE 1 is a schematic view of a thirty-six slot, four pole, primary core for a three phase induction motor and showing only part of the concentric winding in accordance with the present invention; and FIGURE 2 is a diagrammatic developed view of the complete winding on the primary core of FIGURE 1.

A polyphase induction motor is an example of a dynamoelectric machine which will benefit from a sinusoidal m.m.f. made possible by this invention. Other rotating machines would include synchronous motors, generators, etc. In a polyphase induction motor having an integral-slot winding, the slots S per phase $m$ per pole P is an integer $u$. For example, in a three phase induction motor having the thirty-six slot, four pole primary core shown in FIGURE 1, $u=3$. In accordance with the present invention a graded concentric winding for the primary of a three phase induction motor permeable core is provided which substantially eliminates the first $(u-1)$ possible harmonics from the air-gap m.m.f. field. By "possible harmonics" is meant all m.m.f. harmonics which can exist in the air gap in a balanced polyphase winding. It is known that in a balanced three phase winding the possible harmonics are given by $$n = 6a \pm 1, \text{ or } 2ma \pm 1$$

generally for a polyphase winding, where $n$ is the order of a possible harmonic, and $a$ is any integer (1, 2, 3, etc.). Accordingly, in a balanced three phase winding the possible harmonics are the 5th, 7th, 11th, 13th, 17th, 19th, and so on.

Considering now the general case of a graded concentric winding in accordance with the present invention, let $C_1$ be the number of winding turns in the outermost coil of each phase pole group of $u$ coils, $C_2$ the number of winding turns in the next inward coil of that phase pole group, and so on to the innermost coil of that phase pole group, for which case $C_u$ is the number of winding turns. The effective series conductors per phase, $Ck_w$, is selected by the designer of the motor and can be defined by the following equation:

$$Ck_w = \frac{2P}{QR}\left[C_1 \sin\left(\frac{\Theta_1}{2}\right) + C_2 \sin\left(\frac{\Theta_2}{2}\right) + \cdots\right]$$

where $\Theta_x$ is the span of coil $x$ in electrical degrees. To substantially eliminate the first $(u-1)$ possible space harmonics from the air-gap m.m.f. field, the following simultaneous equations must be satisfied:

$$C_1 \sin\left[\left(\frac{3u-1}{3u}\right)(90°)\right] +$$
$$\qquad C_2 \sin\left[\left(\frac{3u-3}{3u}\right)(90°)\right] \cdots +$$
$$\qquad\qquad C_u \sin\left[\left(\frac{u+1}{3u}\right)(90°)\right] = \frac{Ck_wQR}{2P} \quad (1)$$

$$C_1 \sin\left[(n_1)\left(\frac{3u-1}{3u}\right)(90°)\right] +$$
$$\qquad C_2 \sin\left[(n_1)\left(\frac{3u-3}{3u}\right)(90°)\right] \cdots +$$
$$\qquad\qquad C_u \sin\left[(n_1)\left(\frac{u+1}{3u}\right)(90°)\right] = 0 \quad (2)$$

..............................................................................................

$$C_1 \sin\left[(n_{u-1})\left(\frac{3u-1}{3u}\right)(90°)\right] +$$
$$\qquad C_2 \sin\left[(n_{u-1})\left(\frac{3u-3}{3u}\right)(90°)\right] \cdots +$$
$$\qquad\qquad C_u \sin\left[(n_{u-1})\left(\frac{u+1}{3u}\right)(90°)\right] = 0(u)$$

where:

$u$ is an integer, three or higher, which is equal to the slots S per phase $m$ per pole P;
$Q$ is the number of parallel circuits in each phase winding;
$R$ is 1.0 for a Y-connected winding or a two phase winding, and is $\sqrt{3}$ for a delta-connected winding; and
$n$ is the order of a possible harmonic designated by the equation $n = 2ma \pm 1$, where $a$ is any integer.

For the more general case of a polyphase winding to cover two and three phase, Equation 1 is generalized to read:

$$C_1 \sin\left[\left(\frac{mu-1}{mu}\right)(90°)\right] +$$
$$C_2 \sin\left[\left(\frac{mu-3}{mu}\right)(90°)\right] \cdots +$$
$$C_u \sin[K(90°)] = \frac{Ck_wQR}{2P} \quad (4)$$

where $$K \begin{cases} \left(\frac{u+1}{mu}\right) \text{ for three phase,} \\ \left(\frac{2a\pm1}{mu}\right) \text{ for two phase, where } a \text{ is any integer.} \end{cases}$$

Equations 2 and $u$ are also similarly modified. For other polyphase systems, the simultaneous equations are a natural extension of the above equations.

It should be understood that the values $C_1, C_2 \ldots C_u$ in the foregoing equations are generally rounded off to integers in order to provide an integral number of turns in each instance, so that generally the equations will not be precisely satisfied and therefore the first $(u-1)$ possible harmonics will not be completely eliminated. However, these harmonics are reduced to negligible values by selecting $C_1, C_2$, etc., as integers which satisfy the foregoing equations as closely as possible. By so minimizing these harmonics, the stray load losses which they cause are greatly reduced.

Referring now to a specific example of the present invention, FIGURE 1 shows schematically the primary core X of a three phase, four-pole induction motor having 36 slots, numbered 1-36 in FIGURES 1 and 2, and a like number of teeth between the slots.

The winding on the primary core is made up of 36 coils arranged in 12 identical phase pole groups of three concentric coils each. Each of the three phase windings is arranged to provide four equally spaced poles on the primary core, each such pole being surrounded by three concentric coils of that phase winding. The three phase windings are designated I, II and III, respectively, in FIGURE 2. The coils in each phase winding and the phase windings themselves are interconnected in a conventional manner to provide either a Y-connected winding or a delta-connected winding, either being encompassed by the present invention.

In this particular motor the number of slots (36) divided by the number of poles (4), $S/P=9$. Also, with three phases $m$, there are three slots per pole per phase, or $u=3$. The outermost coil of each phase pole group spans $(S/P-1)$ or 8 teeth on the primary core X. For example, the outermost coil 37 in one particular phase pole group of the II phase winding has one coil side received in slot 1 and the opposite coil side received in slot 9, as shown in FIGURES 1 and 2, and therefore it spans the eight teeth between these slots. The next inward, second coil (i.e., the middle coil of three) in each phase pole group spans two fewer teeth than the outermost coil. For example, the middle coil 38 in the same phase pole group as the above-mentioned coil 37 has its opposite coil sides received respectively in slots 2 and 8, and it spans the six teeth between these slots. The innermost, third coil in each phase pole group spans two fewer teeth than the middle coil. For example, the innermost coil 39 in the same phase pole group as coils 37 and 38 has its opposite coil sides received respectively in slots 3 and 7, and it spans the four teeth between these slots.

Each of the 36 slots receives opposite respective coil sides of two coils, which coils are respectively members of different phase windings, and thus of different phase pole groups. As shown in FIGURES 1 and 2, slot 1 receives one coil side of the aforementioned outermost coil 37 of the first phase pole group (in the II phase winding) and it also receives the opposite coil side of the innermost coil 40 of a second phase pole group (in the I phase winding). Slot 2 receives one coil side of the aforementioned middle coil 38 of the first phase pole group (in the II phase winding) and it also receives the opposite coil side of the middle coil 41 of the second phase pole group (in the I phase winding). Slot 3 receives one coil side of the aforementioned innermost coil 39 of the first phase pole group (in the II phase winding) and it also receives the opposite coil side of the outermost coil 42 of the second phase pole group (in the I phase winding).

Slot 4 receives one coil side of the outermost coil 43 of a third phase pole group (in the I phase winding) and the opposite coil side of the innermost coil 44 of a fourth phase pole group (in the III phase winding). Slot 5 receives one coil side of the middle coil 45 of the third phase pole group (in the I phase winding) and the opposite coil side of the middle coil 46 of the fourth phase pole group (in the III phase winding). Slot 6 receives one coil side of the innermost coil 47 of the third phase pole group (in the I phase winding) and the opposite coil side of the outermost coil 48 of the fourth phase pole group (in the III phase winding).

This same sequence is repeated for successive slots, with slots 7, 9, 10, 12, 13, 15, 16, 18, 19, 21, 22, 24, 25, 27, 28, 30, 31, 33, 34 and 36 each receiving one coil side of the innermost coil of one phase pole group and the opposite coil side of the outermost coil of a different phase pole group, and with the remaining slots 8, 11, 14, 17, 20, 23, 26, 29 and 32 each receiving one coil side of the middle coil of one phase pole group and the opposite coil side of the middle coil of a different phase pole group. Thus, every third slot receives the opposite coil sides respectively of the middle coils of different phase pole groups, while the other two-thirds of the slots each receive one coil side of an outermost coil and the opposite coil side of an innermost coil of two different phase pole groups, respectively.

Each phase pole group (of three concentric coils each) has its winding turns distributed so that the foregoing simultaneous equations are satisfied as closely as possible with an integral-slot winding. In the particular 36 slot, 3 phase, 4 pole motor under discussion, these equations simplify to become:

$$C_1 \sin 80° + C_2 \sin 60° + C_3 \sin 40° = \frac{Ck_wQR}{2P} \quad (5)$$

$$C_1 \sin (5\times80°) + C_2 \sin (5\times60°) + C_3 \sin (5\times40°) = 0 \quad (6)$$

$$C_1 \sin (7\times80°) + C_2 \sin (7\times60°) + C_3 \sin (7\times40°) = 0 \quad (7)$$

The solution to these equations yields:

$C_1 = .07380Ck_wQR$
$C_2 = .04835Ck_wQR$
$C_3 = .01625Ck_wQR$

Therefore, if each phase pole group has the winding turns in its three coils graded in accordance with these values, this will reduce the fifth and seventh harmonics to a minimum.

In one practical embodiment in which the stator winding is a Y-connected winding, the outermost coil of each phase pole group in this motor has 51 winding turns, the middle coil has 33 turns, and the innermost coil has 11 turns. This substantially satisfies the foregoing equations. In this specific embodiment every third slot (receiving two middle coil sides) has 66 turns therein, while the remaining slots (each receiving an outermost coil side of one group and an innermost coil side of another group) has 62 turns. Consequently, there is full utilization of one-third of the slots assuming that the capacity of each slot is 66 turns, while each of the remaining slots receives only four fewer turns than its capacity. Consequently, there is almost full utilization of the slot capacity in the primary core.

While the specific example just given is directed to a motor having a slots/pole ratio of nine, and a slots/phase/pole ratio of three, it is to be understood that this invention is applicable generally to any polyphase integral-slot dynamoelectric machine in which the primary winding is composed of like groups of concentric coils providing $mP$ phase pole groups of $u$ coils each, where $u$ is an integer, three or higher, and is equal to $S/mP$, the outermost coil of each phase pole group spanning $(S/P-1)$ teeth, and each successive inward coil of each phase pole group spanning two fewer teeth than the next outward coil of that same group.

The following table gives the values for $K_1, K_2 \ldots K_u$ for a series of different three phase induction motors in accordance with the principles explained above, with $K_1=C_1(2P)$, $K_2=C_2(2P) \ldots K_u=C_u(2P)$ in the first set of Equations 1, 2 ... $u$ set forth hereinbefore:

TABLE I

| S/P | u | $K_1$ | $K_2$ | $K_3$ | $K_4$ | $K_5$ | $K_6$ |
|---|---|---|---|---|---|---|---|
| 9 | 3 | .5904 | .3868 | .1300 | | | |
| 12 | 4 | .4580 | .3515 | .2209 | .0754 | | |
| 15 | 5 | .3737 | .3090 | .2309 | .1427 | .0483 | |
| 18 | 6 | .3346 | .2722 | .2072 | .1527 | .0996 | .0356 |

In the use of the foregoing table in any particular instance, in order to arrive at the actual number of turns in each winding, the table values of $K_1$, $K_2$ etc. must be multiplied by the actual value of $$\left(\frac{Ck_wQR}{2P}\right)$$

selected by the designer for that motor.

The values $K_1$, $K_2$ and $K_3$ in the first line of this table (for $S/P=9$) will be seen to be in agreement with the values already given for the 36 slot, 4 pole motor in which $$C_1=\frac{K_1}{2P}=\frac{K_1}{8}$$

etc. These values $K_1$, $K_2$, $K_3$ in the first line of the table also would apply to a 72 slot, 3 phase, 8 pole motor, for example, or any other motor having a slots/phase/pole ratio of 3.

The values $K_1$, $K_2$, $K_3$ and $K_4$ in the second line of this table are for a motor in which the slots/phase/pole ratio is 4, for example, a 48 slot, 3 phase, 4 pole motor. In any such case, slots per phase per pole, $u=4$, and the first $(u-1)$, or three, possible harmonics (the fifth, seventh and eleventh) are substantially eliminated.

The values $K_1$, $K_2$, $K_3$, $K_4$ and $K_5$ in the third line of this table are for a motor in which the slots/poles ratio is 15. In any such case, the slots per phase per pole, $u=5$, and the first $(u-1)$, or four, possible harmonics, namely, the fifth, seventh, eleventh and thirteenth, are substantially eliminated.

The values $K_1$–$K_6$ in the fourth line of this table are for a motor in which the slots/poles ratio is 18. In any such case, the slots per phase per pole, $u=6$, and the first $(u-1)$, or five, possible harmonics, namely, the fifth, seventh, eleventh, thirteenth and seventeenth, are substantially eliminated.

In each of the cases listed in the foregoing table, the least-filled slot in the primary core will be filled to more than 90% of the capacity of the most-filled slot, so that highly efficient utilization of the total slot capacity is provided in addition to the principal purpose of substantially eliminating the first $(u-1)$ possible harmonics.

From the foregoing description, it will be apparent to those skilled in the art of induction motor design that the harmonic content and thus the stray load losses caused by harmonics and the cusps in the speed-torque curve can be minimized in accordance with the present invention in any polyphase induction motor having a primary core with a slots/phase/pole ratio which is three or more, and an integral-slot winding on the primary core composed of $m$ phase windings and having $mP$ concentric phase pole groups of coils, each phase pole group consisting of $u$ coils, $u$ being an integer not lower than three. In any such motor the two coils in each slot fill the slot at, or close to, its full capacity. Each slot will, of course, have phase insulation between the two coils in it. Where machine winding is employed, each particular coil will have its opposite coil sides in the bottom of both of the respective slots, or in the top of those slots, so that no coil can interfere with the machine winding of another coil. Alternatively, if winding by hand is employed, each coil may have one of its coil sides at the bottom of one slot and its opposite coil side at the top of the other slot which receives it. In both cases, i.e., machine wound or hand wound, the winding is balanced with respect to the line-to-neutral phase impedances.

The above Table I of values of K is limited to those cases wherein $u$ is three or more and the slots per pole are nine or more. It has been found that if one attempts to have only two slots per phase per pole, then this does not give sufficient elimination of harmonics to warrant use of the principles of this invention. As an example, considering a three phase, four pole motor, the calculated harmonic content for graded concentric windings of six slots per pole and nine slots per pole are shown in the following table:

TABLE II

| Order of Harmonic | Magneto Motive Force (MMF) of Winding, Percent of Fundamental | |
|---|---|---|
| | 6 Slots/Pole | 9 Slots/Pole |
| Fundamental | 100.000 | 100.000 |
| 5 | 0.002 | 0.102 |
| 7 | 0.009 | 0.050 |
| 11 | 9.091 | 0.031 |
| 13 | 7.692 | 0.040 |
| 17 | 0.001 | 5.882 |
| 19 | 0.000 | 5.262 |
| 23 | 4.348 | 0.021 |
| 25 | 4.000 | 0.014 |

The 9% and 7.6% slot harmonics in a six slot per pole winding obviates the advantages of a graded concentric winding and this is why the value of $u$ is chosen as three or more. A slot harmonic is defined as the harmonics equal to $2S/P\pm1$. These are called slot harmonics because of the inherent nature of the number of slots relative to the number of poles and it is not possible to eliminate these harmonics by any choice of graded concentric windings. With only two slots per phase per pole, this does nothing to eliminate the large 11th and 13th harmonics and, accordingly, this invention is useful in those cases where $u$ equals three or more. Also, Table II shows that the present invention has a side benefit of substantially eliminating all of the higher order harmonics except the slot harmonics, when the formulas are used to calculate the grading of the concentric windings, solving for the attempted elimination of only the 5th and 7th harmonics. This shows that the use of the present invention is meritorious in achieving an air-gap m.m.f. sufficiently close to a sine wave that the 11th and 13th harmonics are also substantially eliminated.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. A polyphase dynamoelectric machine having P poles including a core having S slots and teeth between said slots, and a graded winding on said core in said slots composed of $m$ phase windings equal to the number of phases and formed into coils arranged in like groups of concentric coils providing $mP$ phase pole groups of $u$ coils each, where $u$ is an integer not lower than three and is equal to the slots S per phase $m$ per pole P, and each said phase pole group of $u$ coils having the winding turns distributed so that for a given total effective conductors per phase $Ck_w$, the following equations are substantially satisfied:

$$C_1 \sin\left[\left(\frac{mu-1}{mu}\right)(90°)\right] +$$
$$C_2 \sin\left[\left(\frac{mu-3}{mu}\right)(90°)\right] \cdots +$$
$$C_u \sin[K(90°)] = \frac{Ck_w QR}{2P}$$

$$C_1 \sin\left[(n_1)\left(\frac{mu-1}{mu}\right)(90°)\right] +$$
$$C_2 \sin\left[(n_1)\left(\frac{mu-3}{mu}\right)(90°)\right] \cdots +$$
$$C_u \sin[(n_1)K(90°)] = 0$$

..........

$$C_1 \sin\left[(n_{u-1})\left(\frac{mu-1}{mu}\right)(90°)\right] +$$
$$C_2 \sin\left[(n_{u-1})\left(\frac{mu-3}{mu}\right)(90°)\right] \cdots +$$
$$C_u \sin[(n_{u-1})K(90°)] = 0$$

where:
Q is the number of parallel circuits in each phase winding;
R is 1.0 for a Y-connected winding or two phase winding, and is $\sqrt{3}$ for a delta-connected winding;
$n$ is the order of a possible harmonic designated by the equation $n=2ma\pm1$, where $a$ is any integer;
$C_1$ is the number of winding turns of the outer coil in each phase pole group;
$C_2$ is the number of winding turns of the next inward coil in each phase pole group;
$C_u$ is the number of winding turns of the innermost coil in each phase pole group; and $$K = \begin{cases} \left(\frac{u+1}{mu}\right) \text{ for 3 phase,} \\ \left(\frac{2a\pm1}{mu}\right) \text{ for 2 phase, where } a \text{ is any integer.} \end{cases}$$

2. A polyphase dynamoelectric machine having P poles including a core having S slots and teeth between said slots, and a graded integral-slot winding on said core in said slots composed of $m$ phase windings equal to the number of phases and formed into coils arranged in like groups of concentric coils providing $mP$ phase pole groups of $u$ coils each, where $u$ is an integer not lower than three and is equal to the slots S per phase $m$ per pole P, the outermost coil in each phase pole group spanning $(S/P-1)$ teeth, and each said phase pole group of $u$ coils having the winding turns distributed so that for a given total effective conductors per phase $Ck_w$, the following equations are substantially satisfied:

$$C_1 \sin\left[\left(\frac{mu-1}{mu}\right)(90°)\right] +$$
$$C_2 \sin\left[\left(\frac{mu-3}{mu}\right)(90°)\right] \cdots +$$
$$C_u \sin[K(90°)] = \frac{Ck_w QR}{2P}$$

$$C_1 \sin\left[(n_1)\left(\frac{mu-1}{mu}\right)(90°)\right] +$$
$$C_2 \sin\left[(n_1)\left(\frac{mu-3}{mu}\right)(90°)\right] \cdots +$$
$$C_u \sin[(n_1)K(90°)] = 0$$

..........

$$C_1 \sin\left[(n_{u-1})\left(\frac{mu-1}{mu}\right)(90°)\right] +$$
$$C_2 \sin\left[(n_{u-1})\left(\frac{mu-3}{mu}\right)(90°)\right] \cdots +$$
$$C_u \sin[(n_{u-1})K(90°)] = 0$$

where:
Q is the number of parallel circuits in each phase winding;
R is 1.0 for a Y-connected winding or two phase winding and is $\sqrt{3}$ for a delta-connected winding;
$n$ is the order of a possible harmonic designated by the equation $n=2ma\pm1$, where $a$ is any integer;
$C_1$ is the number of winding turns of the outer coil in each phase pole group;
$C_2$ is the number of winding turns of the next inward coil in each phase pole group;
$C_u$ is the number of winding turns of the innermost coil in each phase pole group; and $$K = \begin{cases} \left(\frac{u+1}{mu}\right) \text{ for 3 phase,} \\ \left(\frac{2a\pm1}{mu}\right) \text{ for 2 phase, where } a \text{ is any integer.} \end{cases}$$

3. A polyphase dynamoelectric machine having P poles including a core having S slots and teeth between said slots, and a graded integral-slot winding on said core in said slots composed of phase windings equal to the number of phases $m$ and formed into coils arranged in like groups of concentric coils providing phase pole groups of $u$ coils each, where $u$ is an integer not lower than three and is equal to the slots S per phase $m$ per pole P, the outermost coil in each phase pole group spanning $S/P-1$ teeth, and each successive inward coil in each phase pole group spanning a given number of teeth fewer than the next outward coil of that group, at least two said coil sides from different phase windings respectively being positioned in each said slot, and each said phase pole group of coils having the winding turns distributed so that for a given total effective conductors per phase $Ck_w$, the following equations are substantially satisfied:

$$C_1 \sin\left[\left(\frac{mu-1}{mu}\right)(90°)\right] +$$
$$C_2 \sin\left[\left(\frac{mu-3}{mu}\right)(90°)\right] \cdots +$$
$$C_u \sin[K(90°)] = \frac{Ck_w QR}{2P}$$

$$C_1 \sin\left[(n_1)\left(\frac{mu-1}{mu}\right)(90°)\right] +$$
$$C_2 \sin\left[(n_1)\left(\frac{mu-3}{mu}\right)(90°)\right] \cdots +$$
$$C_u \sin[(n_1)K(90°)] = 0$$

..........

$$C_1 \sin\left[(n_{u-1})\left(\frac{mu-1}{mu}\right)(90°)\right] +$$
$$C_2 \sin\left[(n_{u-1})\left(\frac{mu-3}{mu}\right)(90°)\right] \cdots +$$
$$C_u \sin[(n_{u-1})K(90°)] = 0$$

where:
- Q is the number of parallel circuits in each phase winding;
- R is 1.0 for a Y-connected winding or two phase winding, and is $\sqrt{3}$ for a delta-connected winding;
- n is the order of a possible harmonic designated by the equation $n = 2ma \pm 1$, where $a$ is any integer;
- $C_1$ is the number of winding turns of the outer coil in each phase pole group;
- $C_2$ is the number of winding turns of the next inward coil in each phase pole group;
- $C_u$ is the number of winding turns of the innermost coil in each phase pole group; and $$K = \begin{cases} \left(\dfrac{u+1}{mu}\right) \text{ for 3 phase,} \\ \left(\dfrac{2a \pm 1}{mu}\right) \text{ for 2 phase, where } a \text{ is any integer.} \end{cases}$$

4. A three phase induction motor having P poles including a primary core having S slots and teeth between said slots, where $S/P$ is a multiple of three not lower than nine, and a graded integral-slot winding on said core in said slots composed of three phase windings and formed into coils arranged in like groups of concentric coils providing 3P phase pole groups of $u$ coils each, where $u$ is an integer not lower than three and is equal to $S/3P$, the outermost coil in each phase pole group spanning $S/P-1$ teeth, and each successive inward coil in each phase pole group spanning a given number of teeth fewer than the next outward coil of that group, at least two said coil sides from different phase windings respectively being positioned in each said slot, and each said phase pole group of coils having the winding turns distributed so that for a given total effective conductors per phase $Ck_w$, the following equations are substantially satisfied:

$$C_1 \sin\left[\left(\frac{3u-1}{3u}\right)(90°)\right] +$$
$$C_2 \sin\left[\left(\frac{3u-3}{3u}\right)(90°)\right] \cdots +$$
$$C_u \sin\left[\left(\frac{u+1}{3u}\right)(90°)\right] = \frac{Ck_w QR}{2P}$$

$$C_1 \sin\left[(n_1)\left(\frac{3u-1}{3u}\right)(90°)\right] +$$
$$C_2 \sin\left[(n_1)\left(\frac{3u-3}{3u}\right)(90°)\right] \cdots +$$
$$C_u \sin\left[(n_1)\left(\frac{u+1}{3u}\right)(90°)\right] = 0$$

$$\cdots\cdots\cdots\cdots\cdots\cdots\cdots\cdots\cdots\cdots\cdots\cdots\cdots$$

$$C_1 \sin\left[(n_{u-1})\left(\frac{3u-1}{3u}\right)(90°)\right] +$$
$$C_2 \sin\left[(n_{u-1})\left(\frac{3u-3}{3u}\right)(90°)\right] \cdots +$$
$$C_u \sin\left[(n_{u-1})\left(\frac{u+1}{3u}\right)(90°)\right] = 0$$

where:
- Q is the number of parallel circuits in each phase winding;
- R is 1.0 for a Y-connected winding, and is $\sqrt{3}$ for a delta-connected winding;
- n is the order of a possible harmonic designated by the equation $n = 6a \pm 1$, where $a$ is any integer;
- $C_1$ is the number of winding turns of the outer coil in each phase pole group;
- $C_2$ is the number of winding turns of the next inward coil in each phase pole group; and
- $C_u$ is the number of winding turns of the innermost coil in each phase pole group.

5. A three phase induction motor having P poles including a primary core having S slots and teeth between said slots, where $S/P$ is a multiple of three not lower than nine, and a graded integral-slot winding on said core in said slots composed of three phase windings and formed into coils arranged in like groups of concentric coils providing 3P phase pole groups of $u$ coils each, where $u$ is an integer not lower than three and is equal to $S/3P$, the outermost coil in each phase pole group spanning $S/P-1$ teeth, each successive inward coil in each phase pole group spanning two fewer teeth than the next outward coil of that group, two said coil sides from different phase windings respectively being positioned in each said slot, and each said phase pole group of coils having the winding turns distributed so that for a given total effective conductors per phase $Ck_w$, the following $u$ number of simultaneous equations are substantially satisfied:

$$C_1 \sin\left[\left(\frac{3u-1}{3u}\right)(90°)\right] +$$
$$C_2 \sin\left[\left(\frac{3u-3}{3u}\right)(90°)\right] \cdots +$$
$$C_u \sin\left[\left(\frac{u+1}{3u}\right)(90°)\right] = \frac{Ck_w QR}{2P}$$

$$C_1 \sin\left[(n_1)\left(\frac{3u-1}{3u}\right)(90°)\right] +$$
$$C_2 \sin\left[(n_1)\left(\frac{3u-3}{3u}\right)(90°)\right] \cdots +$$
$$C_u \sin\left[(n_1)\left(\frac{u+1}{3u}\right)(90°)\right] = 0$$

$$\cdots\cdots\cdots\cdots\cdots\cdots\cdots\cdots\cdots\cdots\cdots\cdots\cdots$$

$$C_1 \sin\left[(n_{u-1})\left(\frac{3u-1}{3u}\right)(90°)\right] +$$
$$C_2 \sin\left[(n_{u-1})\left(\frac{3u-3}{3u}\right)(90°)\right] \cdots +$$
$$C_u \sin\left[(n_{u-1})\left(\frac{u+1}{3u}\right)(90°)\right] = 0$$

where:
- Q is the number of parallel circuits in each phase winding;
- R is 1.0 for a Y-connected winding, and is $\sqrt{3}$ for a delta-connected winding;
- n is the order of a possible harmonic designated by the equation $n = 6a \pm 1$, where $a$ is any integer;
- $C_1$ is the number of winding turns of the outer coil in each phase pole group;
- $C_2$ is the number of winding turns of the next inward coil in each phase pole group; and
- $C_u$ is the number of winding turns of the innermost coil in each phase pole group.

6. A three phase dynamoelectric machine having P poles including a core having S slots and teeth between said slots, where $S/P = 9$, and a graded integral-slot winding on said core in said slots composed of three phase windings and formed into coils arranged in like groups of concentric coils providing 3P phase pole groups of three coils each, the outer coil in each phase pole group spanning eight pole teeth, the middle coil in each phase pole group spanning six pole teeth, and the inner coil in each phase pole group spanning four pole teeth, two said coils from different phase windings respectively being positioned in each said slot, and each said phase pole group of coils having the winding turns distributed substantially in accordance with the following relationships:

$$C_1 = .5904 \frac{Ck_w QR}{2P}$$

$$C_2 = .3868 \frac{Ck_w QR}{2P}$$

and $$C_3 = .1300 \frac{Ck_w QR}{2P}$$

where:
- $Ck_w$ is the total effective turns per coil;
- Q is the number of parallel circuits in each phase winding;
- R is 1.0 for a Y-connected winding, and is $\sqrt{3}$ for a delta-connected winding;
- $C_1$ is the number of winding turns of the outer coil in each phase pole group;
- $C_2$ is the number of winding turns of the middle coil in each phase pole group; and
- $C_3$ is the number of winding turns of the inner coil in each phase pole group.

7. A three phase induction motor having P poles including a primary core having S slots and teeth between said slots, where $S/P=12$, and a graded integral-slot winding on said core in said slots composed of three phase windings and formed into coils arranged in like groups of concentric coils providing 3P phase pole groups of four coils each, the outer first coil in each phase pole group spanning eleven pole teeth, the second coil in each phase pole group spanning nine pole teeth, the third coil in each phase pole group spanning seven pole teeth, and the innermost fourth coil in each phase pole group spanning five pole teeth, two said coils from different phase windings respectively being positioned in each said slot, and each said phase pole group of coils having the winding turns distributed substantially in accordance with the following relationships:

$$C_1 = .4580 \frac{Ck_w QR}{2P}$$

$$C_2 = .3515 \frac{Ck_w QR}{2P}$$

$$C_3 = .2209 \frac{Ck_w QR}{2P}$$

$$C_4 = .0745 \frac{Ck_w QR}{2P}$$

where:
- $Ck_w$ is the total effective turns per coil;
- Q is the number of parallel circuits in each phase winding;
- R is 1.0 for a Y-connected winding, and is $\sqrt{3}$ for a delta-connected winding;
- $C_1$ is the number of winding turns of the outer first coil in each phase pole group;
- $C_2$ is the number of winding turns of the second coil in each phase pole group;
- $C_3$ is the number of winding turns of the third coil in each phase pole group; and
- $C_4$ is the number of turns of the innermost fourth coil in each phase pole group.

8. A three phase induction motor having P poles including a primary core having S slots and teeth between said slots, where $S/P=15$, and a graded integral-slot winding on said core in said slots composed of three phase windings and formed into coils arranged in like groups of concentric coils providing 3P phase pole groups of five coils each, the outer first coil in each phase pole group spanning fourteen pole teeth, the second coil in each phase pole group spanning twelve pole teeth, the third coil in each phase pole group spanning ten pole teeth, the fourth coil in each phase pole group spanning eight pole teeth, and the innermost fifth coil in each phase pole group spanning six pole teeth, two said coils from different phase windings respectively being positioned in each said slot, and each said phase pole group of coils having the winding turns distributed substantially in accordance with the following relationships:

$$C_1 = .3737 \frac{Ck_w QR}{2P}$$

$$C_2 = .3090 \frac{Ck_w QR}{2P}$$

$$C_3 = .2309 \frac{Ck_w QR}{2P}$$

$$C_4 = .1427 \frac{Ck_w QR}{2P}$$

$$C_5 = .0483 \frac{Ck_w QR}{2P}$$

where:
- $Ck_w$ is the total effective turns per coil;
- Q is the number of parallel circuits in each phase winding;
- R is 1.0 for a Y-connected winding, and is $\sqrt{3}$ for a delta-connected winding;
- $C_1$ is the number of winding turns of the outer first coil in each phase pole group;
- $C_2$ is the number of winding turns of the second coil in each phase pole group;
- $C_3$ is the number of winding turns of the third coil in each phase pole group;
- $C_4$ is the number of winding turns of the fourth coil in each phase pole group; and
- $C_5$ is the number of winding turns of the innermost fifth coil in each phase pole group.

9. A three phase induction motor having P poles including a primary core having S slots and teeth between said slots, where $S/P=18$, and a graded integral-slot winding on said core in said slots composed of three phase windings and formed into coils arranged in like groups of concentric coils providing 3P phase pole groups of six coils each, the outer first coil in each phase pole group spanning seventeen pole teeth, the second coil in each phase pole group spanning fifteen pole teeth, the third coil in each phase pole group spanning thirteen pole teeth, the fourth coil in each phase pole group spanning eleven pole teeth, the fifth coil in each phase pole group spanning nine pole teeth, and the innermost sixth coil in each phase pole group spanning seven pole teeth, two said coils from different phase windings being positioned in each said slot, and each said phase pole group of coils having the winding turns distributed substantially in accordance with the following relationships:

$$C_1 = .3346 \frac{Ck_w QR}{2P}$$

$$C_2 = .2722 \frac{Ck_w QR}{2P}$$

$$C_3 = .2072 \frac{Ck_w QR}{2P}$$

$$C_4 = .1527 \frac{Ck_w QR}{2P}$$

$$C_5 = .0996 \frac{Ck_w QR}{2P}$$

$$C_6 = .0356 \frac{Ck_w QR}{2P}$$

where:
- $Ck_w$ is the total effective turns per coil;
- Q is the number of parallel circuits in each phase winding;
- R is 1.0 for a Y-connected winding, and is $\sqrt{3}$ for a delta-connected winding;

$C_1$ is the number of winding turns of the outermost first coil in each phase pole group;

$C_2$ is the number of winding turns of the second coil in each phase pole group;

$C_3$ is the number of winding turns of the third coil in each phase pole group;

$C_4$ is the number of winding turns of the fourth coil in each phase pole group;

$C_5$ is the number of winding turns of the fifth coil in each phase pole group; and $C_6$ is the number of winding turns of the innermost sixth coil in each phase pole group.

References Cited

UNITED STATES PATENTS

| | | | |
|---|---|---|---|
| 888,514 | 5/1908 | Lamme | 310—202 |
| 1,725,849 | 8/1929 | Cope | 310—202 |
| 1,867,328 | 7/1932 | Rienks | 310—202 |
| 2,683,232 | 7/1954 | Weissheimer | 310—202 |
| 2,905,840 | 9/1959 | Dunn | 310—202 |

MILTON O. HIRSHFIELD, *Primary Examiner.*

L. L. SMITH, *Assistant Examiner.*